US005477234A

United States Patent [19]
Suzuki et al.

[11] Patent Number: 5,477,234
[45] Date of Patent: Dec. 19, 1995

[54] LIQUID CRYSTAL DISPLAY APPARATUS

[75] Inventors: Hiroshi Suzuki, Yamato; Midori Suzuki, Machida, both of Japan

[73] Assignee: International Business Machines Corporation, Armonk, N.Y.

[21] Appl. No.: 227,166

[22] Filed: Apr. 13, 1994

[30] Foreign Application Priority Data

Apr. 14, 1993 [JP] Japan ................... 5-087011

[51] Int. Cl.$^6$ ..................................... G09G 3/36
[52] U.S. Cl. ..................... 345/95; 345/98; 345/211
[58] Field of Search ........................... 345/204, 208, 345/211, 212, 213, 98, 99, 100, 94

[56] References Cited

U.S. PATENT DOCUMENTS

| | | | |
|---|---|---|---|
| 4,748,444 | 5/1988 | Arai | 345/100 |
| 4,766,430 | 8/1988 | Gillette et al. | 345/100 |
| 4,841,294 | 6/1989 | Clerc | 345/100 |
| 5,170,155 | 12/1992 | Plus et al. | 345/100 |
| 5,214,417 | 5/1993 | Yamazaki | 345/95 |
| 5,266,936 | 11/1993 | Saitoh | 345/89 |
| 5,337,070 | 8/1994 | Kitajima et al. | 345/211 |

FOREIGN PATENT DOCUMENTS 0418516  6/1992  European Pat. Off. .

Primary Examiner—Richard Hjerpe
Assistant Examiner—Steven Saras
Attorney, Agent, or Firm—Ronald L. Drumheller

[57] ABSTRACT

A drive circuit is disclosed for a liquid crystal display apparatus of the active matrix type having a large number of gray levels that can be displayed. The drive circuit comprises a plurality of sections each including a sample-and-hold circuit 22. The sample-and-hold circuit 22 has a plurality of switches Sw 1 through Sw 4. To these switches are separately supplied different ramp signals Vr 1 through Vr 4 from a ramp generator circuit 24 shared by all the sections. These ramp signals have waveforms which respectively assume a plurality of different voltage levels and are shifted from each other by a predetermined voltage level. The decoder 21 selects one of the switches Sw 1 through Sw 4 and a specific one of the voltage levels in the ramp signal applied to that selected switch depending on the gray scale data in the latch 20. The output of the sample-and-hold circuit is transmitted to the data line 7a via a buffer 23.

6 Claims, 4 Drawing Sheets

LIQUID CRYSTAL DISPLAY APPARATUS

BACKGROUND OF THE INVENTION

1. Field of the Invention

The present invention relates to a liquid crystal display (LCD) apparatus of active matrix type that displays gray scale and more particularly to a drive apparatus for producing a drive voltage on data lines of a display panel.

2. Related Art

A liquid crystal display (LCD) of the active matrix type having the construction schematically shown in FIG. 1 is known. The LCD comprises a display panel 1, a scan circuit 2, a drive circuit 3, a data source 4 and a ramp generator 5. The display panel 1 is equipped with a plurality of gate lines 6a through 6m and a plurality of data lines 7a through 7n arranged in a matrix form. At each of the crossing points of these gate lines and data lines, a thin film transistor (TFT) device and a pixel electrode are mounted. The drive circuit 3 is a so-called digital-analog type circuit. The drive circuit 3 comprises a plurality of sections corresponding to the plurality of data lines. Each section receives gray scale data concerning one pixel from the data source 4. It also receives a ramp signal (staircase waveform), which repetitively indicates a plurality of voltage levels corresponding to a plurality of gray scales, from the ramp generator 5. Each section selects a voltage level corresponding to the gray scale data and applies it to a corresponding data line. At the same time, the scan circuit 2 successively supplies the gate lines 6a through 6m with a gate pulse that continues for a predetermined time in synchronization with the ramp signal. The TFT selected by the gate pulse applies the voltage level of the data line to the pixel electrode associated with it to charge the liquid crystal electrostatic capacitance thereby, thus providing a gray scale display.

Each drive circuit section has a data latch 10, a decoder 11, a sample hold circuit 12 and a buffer 13, as schematically shown in FIG. 2. The gray scale data for one pixel held in the data latch 10 comprises bits in the number corresponding to the number of gray levels. In case of 16 gray scales, for example, the gray scale data comprises 4 bits. Then the ramp signal Vr applied to the line 14 assumes 16 voltage levels. The decoder 11 generates a sampling pulse for selecting the ramp voltage level corresponding to the gray scale data under the control of a clock. The sample-and-hold circuit 12 causes the switch Sw to conduct electricity in accordance with the sampling pulse to hold the specific voltage level in the capacitor C. The voltage level sampled and held in this way is applied to the data line 7a via a buffer 13.

Although the above described scheme realizes gray scale display with up to 16 gray scale levels, it is desired to display a greater number of gray levels. However, the digital-analog type drive has two problems that impede an appropriate increase of gray levels with respect to the sample-and-hold circuit.

First of all, since a shift or an error in the timing of sample hold is reflected as an error in the output voltage, there is a problem in that the error gets ever more serious with an increase in the number of gray levels. In order to clarify this point, reference is made to FIG. 3 showing a timing relation between the gray scale signal portion and the sampling pulse. Vra is, for example, a ramp signal for 64-level grey scale display. When the ramp signal Vra is sampled with the sampling pulse Ps, the presence of an error $\Delta t$ in timing, as shown in FIG. 3, generates an error $\Delta Vo$ with the result that a gray scale value different from the desired gray scale value will be displayed. As a countermeasure against this problem, it is theoretically possible to reduce the timing error $\Delta t$ by improving the external clock that forms the timing basis for the generation of sampling pulses. Such improvement is not easy. In addition, when the number of gray levels is large, a considerable output voltage error still appears even if $\Delta t$ is made smaller.

There is another problem concerning the width (duration time) of sampling pulses. Referring to FIG. 3, the width of the sampling pulse Ps meets the step of ramp signal Vra. When the sampling time that follows such pulse is shorter than the time required for appropriately charging the capacitor C of the sample hold circuit 12, there is a possibility that the specific voltage level of the ramp signal cannot be accurately sampled and held, thereby resulting in an error in output voltage.

It is apparent that the above problems become more and more serious with an increase in the number of gray levels, whereby an accurate gray scale display becomes more and more difficult to achieve. Therefore the main object of the present invention is to attain a greater number of gray levels in a liquid crystal display LCD apparatus of active matrix type by eliminating the above problems.

Another object of the present invention is to provide a LCD drive apparatus that can produce an output voltage with less error on the data line of the display panel even if the number of gray levels increases.

A liquid crystal display apparatus of the active matrix type in accordance with the present invention has a liquid crystal panel with a plurality of gate lines and a plurality of data lines arranged in a matrix form, a scan means for successively producing scan signals on said plurality of gate lines, and drive means for producing output signals for gray scale display on said plurality of data lines in synchronization with said scan signals, and characterized in that the drive means comprises:

ramp generator means for generating a plurality of ramp signals in parallel, said ramp signals having waveforms which respectively assume a plurality of voltage levels and are successively shifted by a predetermined amount to entirely assume the total number of voltage levels corresponding to the number of gray levels; and selector means connected to said ramp generator means and responsive to gray scale data corresponding to each of said data lines for selecting one of said ramp signals and to provide said selected voltage level as an output signal on the corresponding data line.

DESCRIPTION OF A PREFERRED EMBODIMENT

Figure 1:
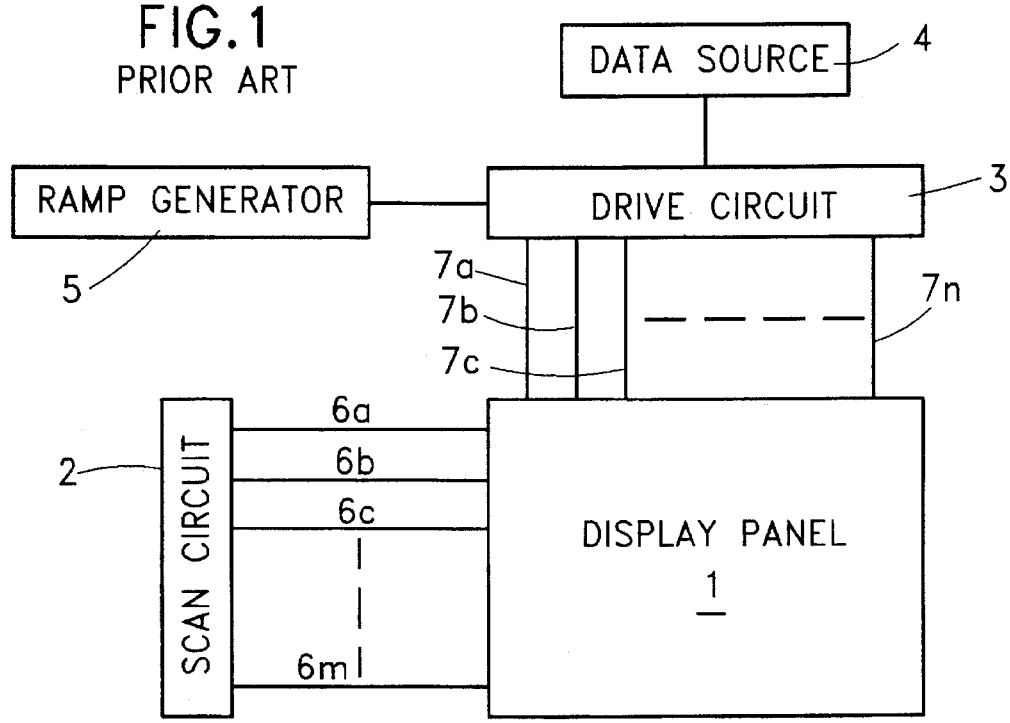
FIG. 1 is a block diagram schematically illustrating a prior art liquid crystal display apparatus of the active matrix type, the apparatus being capable of displaying 64 gray scale levels.
Figure 2:
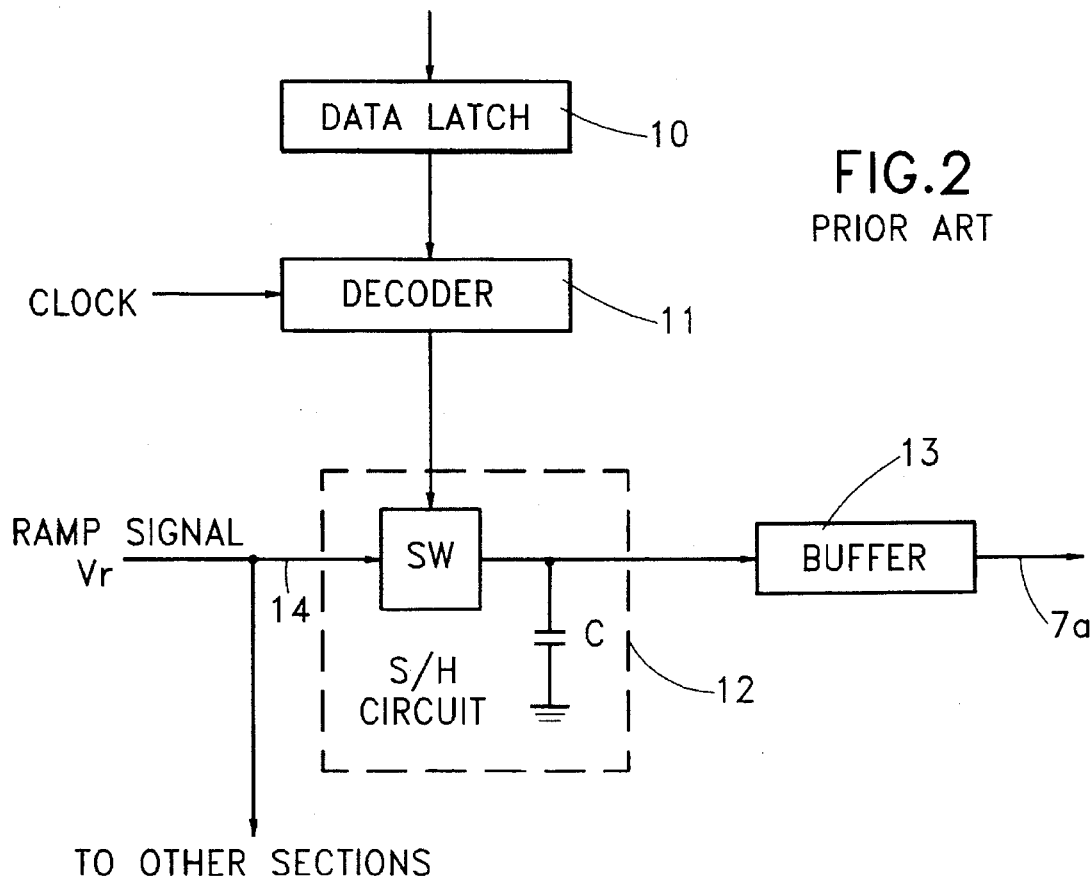
FIG. 2 shows a drive circuit section of the drive circuit shown in FIG. 1, the section generating a drive signal in response to gray scale data for one pixel.
Figure 3:
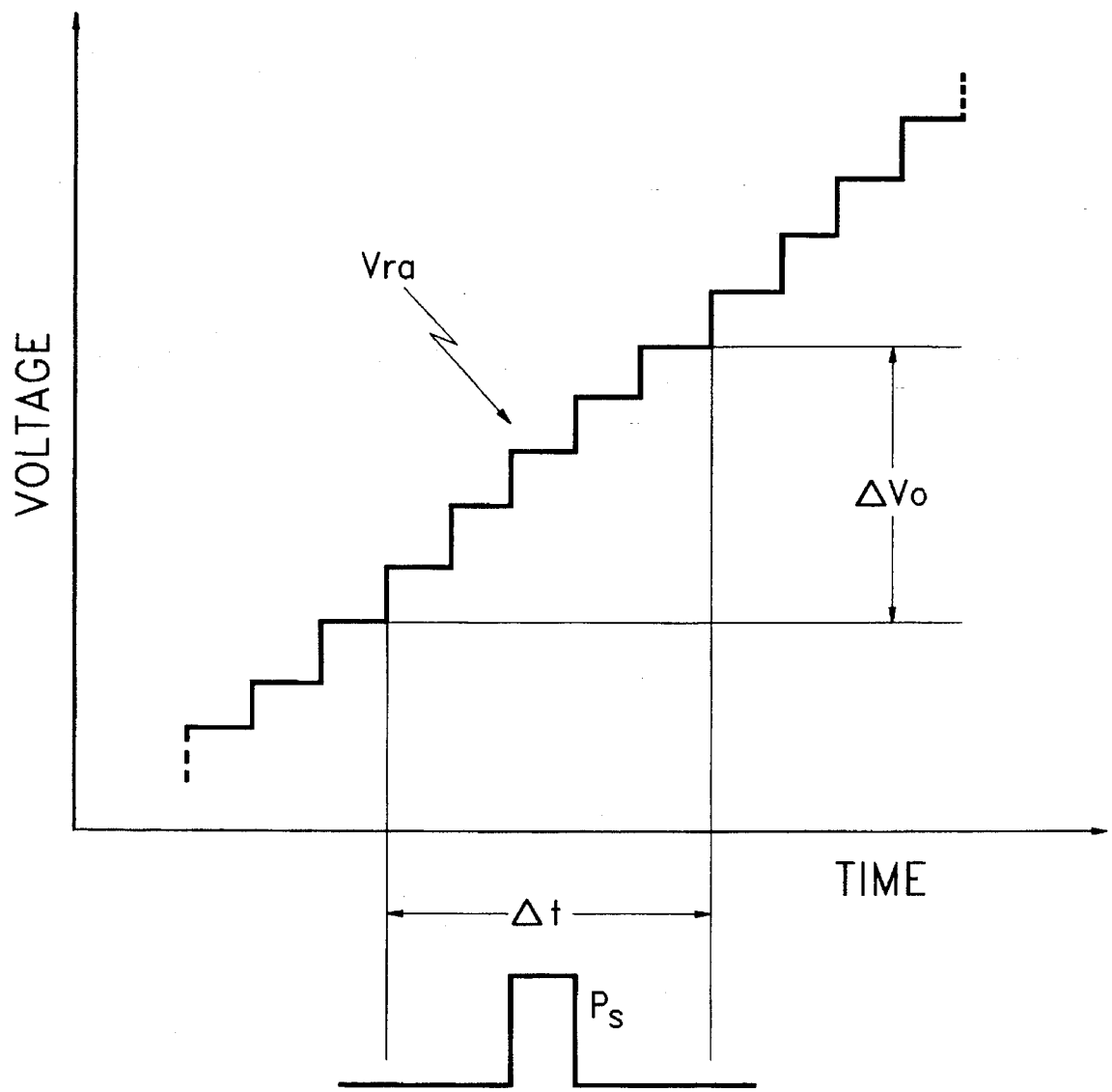
FIG. 3 is illustrates the timing between a ramp signal and a sampling signal.
Figure 4:
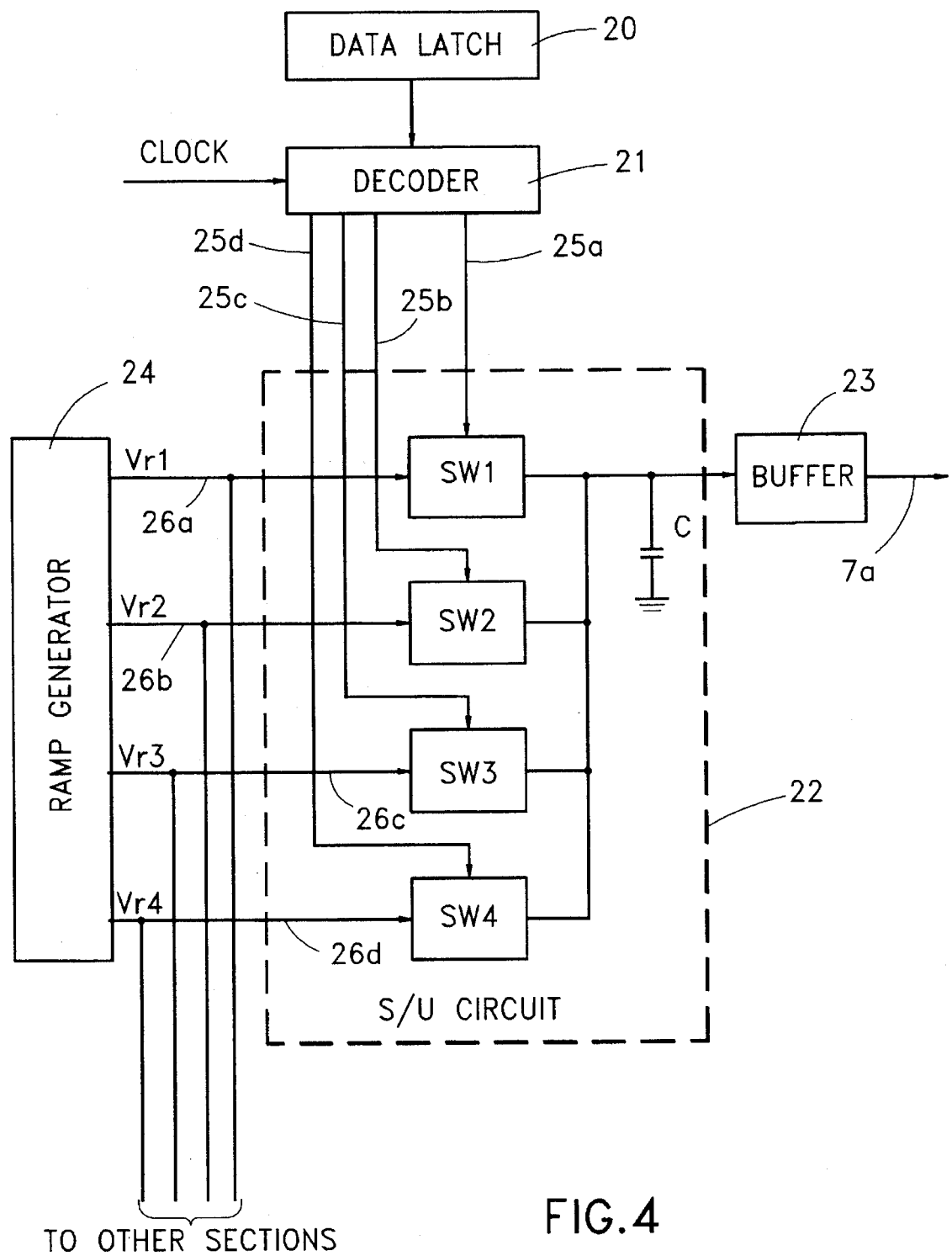
FIG. 4 is shows a ramp generator and a drive circuit section in accordance with the present invention.

FIG. 4 partially shows an LCD drive apparatus for displaying 64 gray scale levels. Namely, FIG. 4 schematically shows only one of the plurality of drive circuit sections and the ramp generator circuit 24. The drive circuit section has a data latch 20, a decoder 21, a sample-and-hold circuit 22 and a buffer 23. The buffer 23 may be the same as the ordinary buffer 13. The ramp generator circuit 24 generates different ramp signals Vr 1, Vr 2, Vr 3, and Vr 4 on four lines 26a, 26b, 26c, 26d. The sample-and-hold circuit 22 has four switches Sw 1, Sw 2, Sw 3, and Sw 4. The input ends of these switches are separately connected to lines 26a through 26d, whereas the output ends are commonly connected to a capacitor C for sample-and-hold. Furthermore, the control input end of switches Sw 1 through Sw 4 are respectively connected to the output lines 25a through 25d of the decoder 21.

Figure 5:
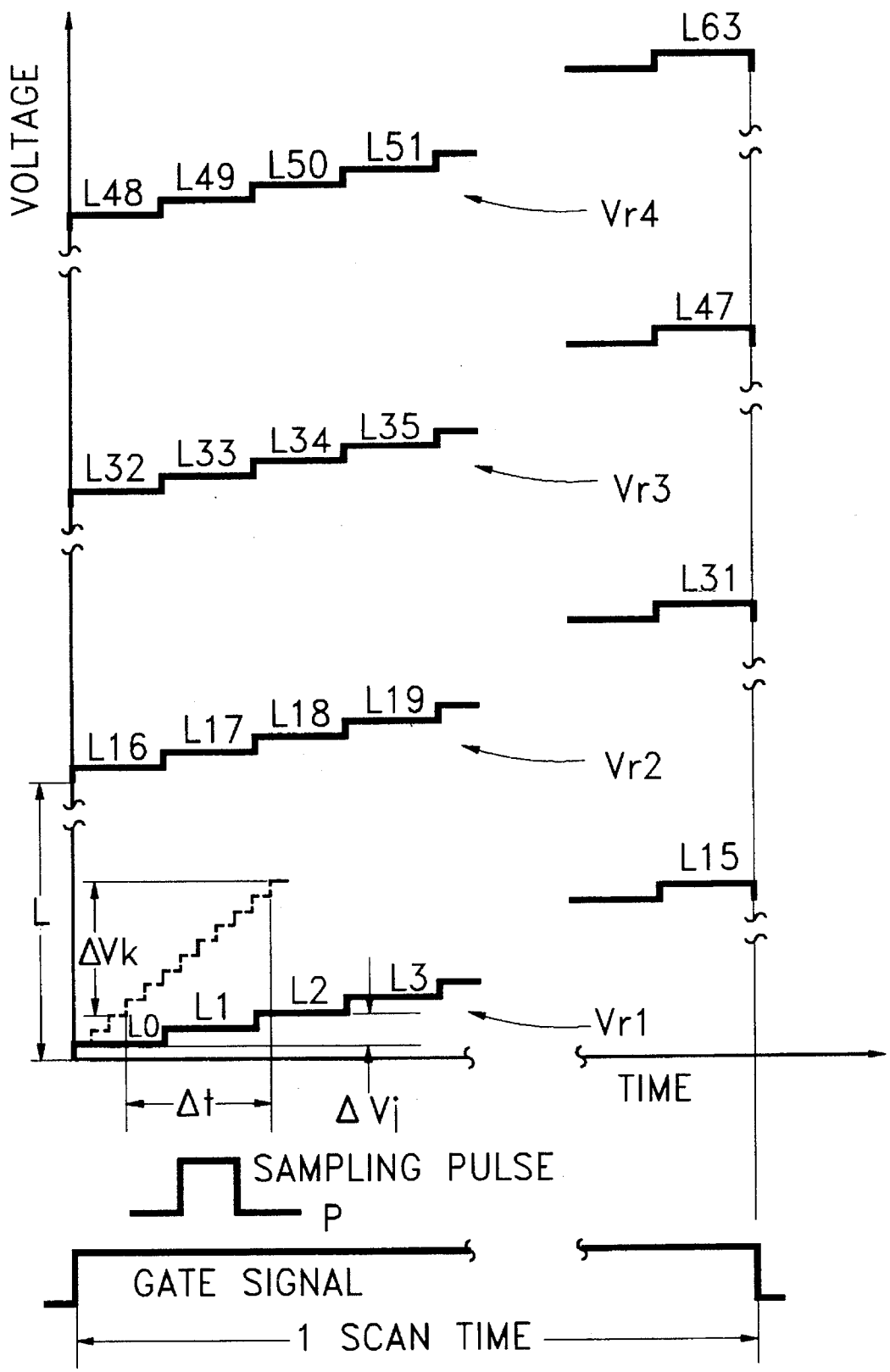
FIG. 5 is shows the waveforms of four ramp signals generated by the ramp generator shown in FIG. 4.

This embodiment of an LCD drive apparatus displays 64 gray levels. As schematically shown in FIG. 5, ramp signals Vr 1 through Vr 4 have waveforms which respectively assume 16 different voltage levels, but are entirely shifted from each other by a predetermined voltage level L. In other words, Vr 1 successively assumes voltage levels L0 through L15 in the scan of each line in the display panel, Vr 2 successively assumes voltage levels L16 through L31. Vr 3 successively assumes voltage levels L32 through L47. Vr 4 successively assumes voltage levels L48 through L63. At the same time, in the data latch 20 gray scale data is received comprising 6 bits for designating any one of the 64 gray scales, i.e., any one of the voltage levels L0 through L63. The decoder 21 decodes the gray scale data to generate a sampling pulse P at an appropriate timing for sampling the designated voltage level and applies it to the appropriate one of the lines 25a through 25d which is connected to the appropriate one of switches Sw 1 through Sw 4. With respect to the gray scale data, the upper 2 bits designate the ramp signal Vr 1 through Vr 4, whereas the lower 4 bits designate which of the voltage levels is selected in the selected one of the ramp signals, namely the particular voltage level. For example, when the gray scale data is given as 010001, a timing pulse for sampling the voltage level L17 of the ramp signal Vr 2 is applied to the switch Sw 2.

For comparison, FIG. 5 shows with a dot line a single ramp signal Vra used for a 64-level gray scale display in accordance with the prior art. Vra must assume 64 voltage levels in the prior art embodiment, whereas each of Vr 1 through Vr 4 only needs to assume 16 voltage levels. Thus apparently, the voltage change is very gradual. Consequently, it is apparent that, even if there is a timing shift Δt in the sampling pulse P, the error ΔVj in the output voltage in the present invention is considerably smaller than the error ΔVk in the output voltage when the prior art scheme is used. In addition, since the width of the sampling pulse P can be relatively wide in the present invention, the capacitor can be charged sufficiently, thereby resulting in the desired gray scale value.

As can be seen from the waveforms of ramp signals Vr 1 through Vr 4, the embodiment in FIG. 5 is constructed so as to be capable of displaying 64 gray scale levels by making relatively small modification to the circuit construction which is fundamentally adapted for 16-level gray scale display. With respect to the drive circuit, the data latch and the decoder in each section are only slightly expanded, and additionally the number of switches in the sample-and-hold circuits and the number of associated wirings are only slightly increased. The IC chip size is hardly increased.

The embodiment mentioned above is just an example. The present invention is not limited to this embodiment. What is required is to generate a plurality of ramp signals. The number of ramp signals, the number of switches, the number of voltage levels included in each ramp signal and the number of gray levels are design details which may be appropriately selected. For example, it is possible to provide a gray scale display having a number of gray scale levels larger than 64 levels by further increasing the number of the ramp signals. In addition, it is also possible to display 64 gray scale levels through the use of two ramp signals respectively assuming 32 voltage levels.

In more general terms, when the number of gray scale levels is z, the number of ramp signals may be y, and the number of voltage levels in each ramp signal will be x, where x times y equals z. It is only required to generate y ramp signals having waveforms shifted successively by a predetermined level so as to provide z different voltage levels corresponding to the z gray levels as a whole. x, y and z are values which may be freely selected while maintaining the relation xy=z.

In accordance with the present invention, the number of gray levels displayed by the LCD of the active matrix type can be considerably increased.

We claim:

1. A liquid crystal display apparatus of the active matrix type having a liquid crystal display panel with a plurality of gate lines and a plurality of data lines arranged in a matrix form, scan means for successively producing scan signals on said plurality of gate lines, and drive means for producing output signals for gray scale display on said plurality of data lines in synchronization with said scan signals, characterized in that said drive means comprises:

a ramp generator means for generating a plurality of ramp signals in parallel, said ramp signals having waveforms which respectively assume a plurality of different voltage levels and are successively shifted from each other by a predetermined voltage level to provide a total number of different voltage levels corresponding to a total number of gray scale levels; and a selector means connected to said ramp generator means and responsive to gray scale data corresponding to each of said data lines for selecting one of said voltage levels in one of said ramp signals and to provide said selected voltage level as an output signal on a corresponding data line.

2. A liquid crystal drive apparatus for generating output signals for gray scale display on a plurality of data lines of a liquid crystal display panel in a liquid crystal display apparatus of the active matrix type, characterized by comprising:

a ramp generator means for generating y ramp signals in parallel on y output lines, said y ramp signals having waveforms which respectively assume x different voltage levels and are successively shifted from each other by a predetermined voltage level, said y and x each representing an integer equal to or greater than 2; and a plurality of drive circuit means, each having an input side and an output side, connected commonly at their input sides to said y output lines of said ramp generator means and connected separately at their output sides to said data lines;

wherein each of said drive circuit means is responsive to gray scale data for a pixel and selects one of said x voltage levels in one of said y ramp signals and provides said selected voltage level as an output signal to a corresponding data line.

3. A liquid crystal drive apparatus according to claim 2 wherein each of said drive circuit means comprises:

a sample-and-hold means having y switches separately connected to y output lines of said ramp generator means on an input side, each of said switches having a control input line;

a latch means for holding a gray scale data; and a decoder means having an input line connected to said latch means and an output line connected separately to said y switches, said decoder means producing on one of its own output lines a sampling pulse for operating one of said y switches determined by said grey scale data at a timing determined by said gray scale data.

4. A liquid crystal drive apparatus according to claim 3 wherein said x and y satisfy the equation xy=z, where z represents a number of gray scale levels, and said y ramp signals provide z different voltage levels.

5. A liquid crystal drive apparatus according to claim 4 wherein said gray scale data pertaining to each pixel comprises a plurality of bits, a predetermined portion of said bits identifying one of said y ramp signals, and the remaining bits thereof identifying an x voltage level in said identified ramp signal.

6. A liquid crystal drive apparatus according to claim 3 wherein said gray scale data pertaining to each pixel comprises a plurality of bits, a predetermined portion of said bits identifying one of said y ramp signals, and the remaining bits thereof identifying an x voltage level in said identified ramp signal.

* * * * *